Nov. 18, 1969    R. M. HEINONEN, JR    3,479,114
INTERMITTENT FILM CONTACT PRESSURE APPARATUS
FOR CINEMATOGRAPHIC CAMERAS
Filed Dec. 28, 1967

INVENTOR.
RUSSELL M. HEINONEN, JR.
BY ALFRED H. ROSEN
and JOHN H. COULT
ATTORNEYS

United States Patent Office 3,479,114
Patented Nov. 18, 1969

3,479,114
INTERMITTENT FILM CONTACT PRESSURE APPARATUS FOR CINEMATOGRAPHIC CAMERAS
Russell M. Heinonen, Jr., Hudson, Mass., assignor to Technical Operations, Incorporated, Burlington, Mass., a corporation of Delaware
Filed Dec. 28, 1967, Ser. No. 694,172
Int. Cl. G03b 1/48
U.S. Cl. 352—225  6 Claims

ABSTRACT OF THE DISCLOSURE

A film gate structure for a motion picture camera has an intermittent film presser member and a diffraction grating. The diffraction grating is mounted in the exposure aperture with its grating surface in the image plane of the objective lens and forming a surface against which the film is pressed. The presser member is a stainless steel insert approximately the size of the exposure aperture and is pressed against the film by a spring biased arm. The spring biased arm has a cam shaped extension in a position to be engaged by the film advancing claw each time the claw penetrates the film apertures. By this engagement the claw releases the pressure on the film during the interval in which the film is advanced.

BACKGROUND OF THE INVENTION

My invention is concerned, in general, with the problem of superimposing upon a primary image erected at the image plane of an optical system, a sharp auxiliary image of a light filter supported, as nearly as possible, in the primary image plane. Due to the effects of light scattering, the resolution of the auxiliary image is critically sensitive to any spacing of the filter from the system image plane. In a photographic camera application it is desirable to effect a firm and intimate engagement of the filter with the photosensitive film material during exposure. In cinematographic cameras of the intermittent film motion type, it is necessary that the film filter contact pressure be applied intermittently in synchronism with the successive exposure intervals.

OBJECTS OF THE INVENTION

It is an object of my invention to provide apparatus in a cinematographic camera for firmly, positively, and intermittently pressing a strip film material against a pressure-receiving surface, which pressure is effective only during successive frame exposure intervals. It is another object to hold intermittently moved strip film material motionless in intimate engagement with a surface of a filter plate during exposure of the film.

It is a further object of my invention to provide apparatus capable of the above functions, and yet which is simple in construction and operation.

Other objects of this invention will in part be obvious and will in part become apparent as the following description proceeds. The features of novelty which characterize the invention will be pointed out with particularity in the claims annexed to and forming a part of this specification.

SUMMARY OF THE INVENTION

This invention concerns apparatus useful in cinematographic cameras for intermittently exerting a firm, positive pressure of a successively advanced film strip against the surface of a filter plate. Apparatus for implementing my invention may comprise a filter plate mounted in the exposure aperture in the plate in a cinematographic camera. The filter plate has an engageable surface which lies substantially in the image plane of the camera objective, which plane is in turn coincident with a film guiding surface on the aperture plate. An intermittent pressure mechanism for pressing successive frames of the film strip into firm engagement with the said engageable surface on the filter plate may include a spring pressure arm biased against a pressure plate acting on the film strip. The arm mounts a cam-follower driven by an intermittent claw mechanism for advancing the film. The driving action of the claw against the spring pressure arm during each film advance interval releases the pressure of the spring pressure arm on the pressure plate to allow advance of the film to the succeeding frame.

DESCRIPTION OF THE PREFERRED EMBODIMENTS

Figure 1:
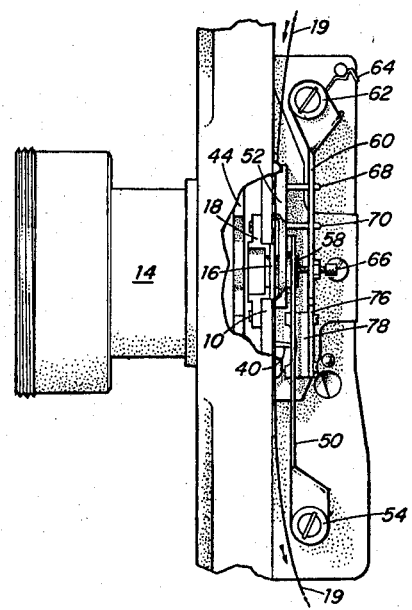
FIGURE 1 is a fragmentary side elevation view of a cine camera film gate apparatus constructed to incorporate my teachings.
Figure 2:
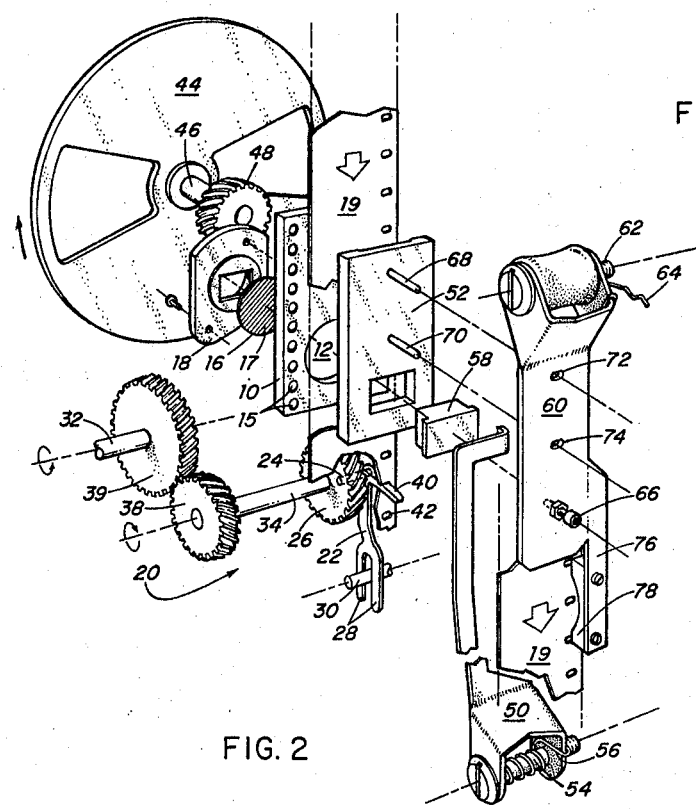
FIGURE 2 is a schematic perspective fragmentary exploded view of the film gate and associated apparatus shown in FIG. 1.

FIGURES 1 and 2 show the concepts of my invention incorporated in a cinematographic camera known commercially as the Bach-Auricon camera. Referring now to the drawings, film gate and associated apparatus incorporating the invention may comprise an aperture plate 10 defining an exposure 12 on the axis of an objective lens assembly 14 functioning to form an image of the photographed scene at an image plane located immediately behind the exposure aperture 12. The image plane is coincident with a film guiding and supporting surface defined by two parallel rows of spherically shaped elements 15 straddling the exposure aperture 12.

It is one of the objectives of my invention to overlay an auxiliary image of a light-affecting pattern carried on a filter plate upon the primary scene image formed by the objective lens assembly 14. To this end, I show a filter plate 16 comprising a transparent rigid substrate (for example, optically flat plate glass) which carries the light-affecting pattern. In the illustrated embodiment, the light-affecting pattern is shown as comprising a diffraction grating 17 lying substantially on the rear surface of the filter plate 16.

In order to secure the filter plate 16 in the exposure aperture 12 such that the rear surface of the filter plate 16, and thus the grating 17, lie in the image plane of the objective lens assembly 14, an annular flanged mounting bracket 18 is provided, shown as being attached to the aperture plate 10.

A film advance mechanism 20 provides an intermittent advance of a film strip 19 through the imaging plane. The mechanism 20 includes a claw member 22 eccentrically mounted by a pin 24 on the side face of a worm gear 26. A pair of parallel legs 28 on the claw member 22 define an open-ended slot in which is captured a guide rod 30 anchored on the camera chassis. The worm gear 26 is driven by a drive source (not shown) through shafts 32 and 34, and a set of spur gears 36 and 38. In operation, as the worm gear 26 is driven, a claw 40 on the claw member 22 periodically reaches up and engages one of the perforations 42 in the film strip 19, pulling the film strip 19 down to the succeeding frame. At the bottom of the pull-down stroke, the eccentric motion of the claw member 22 causes the claw 40 to be withdrawn from the engaged perforation, freeing the claw member 22 for recycling to begin the next pull-down stroke.

A rotary shutter blade 44 is driven in synchronism with the film advance through shaft 46 and worm gears 48 and 26 by the same drive source used to drive the film advance mechanism 20.

A slight but constant bias is applied to the film strip 19 at all times by a bias arm 50 acting on a pressure plate 52 registered with the exposure aperture 12. The bias arm 50 is mounted for rotation about a screw 54 and is angularly biased in the counter-clockwise direction by a torsion spring 56.

In accordance with this invention, the pressure plate 52 carries a pressure-transmitting insert 58 preferably comprising a block of stainless steel having an extremely smooth pressure-transmitting surface, projecting from the forward plane of the pressure plate 52 for engagement with the film strip 19. The pressure-transmitting area on the insert 58 is substantially coextensive with the exposed frame area.

By this invention, an intermittently acting pressure mechanism imparts a firm, positive pressure on the pressure-transmitting insert 58 during exposure of the film strip 19; that is, except during the film advance interval. The intermittent pressure mechanism comprises a spring arm 60 mounted for rotation about a pin 62. A spring 64 provides a torsional force on the spring arm 60 which is considerably greater than the slight bias applied by the torsion spring 56 on the bias arm 50. The angular force generated by the spring 64 is imparted to the pressure plate 52 through an adjustable screw 66 engaging the rear surface of the insert 58. By this arrangement, an area of the film strip 19 substantially coextensive with the area being exposed is pressed by the pressure transmitting surface of the insert 58 into firm, positive, and intimate engagement with the rear surface of the filter plate 16, minimizing the scattering of light from the grating 17 on the filter plate 16, and thus maximizing the resolution of the auxiliary images formed on the film strip 19. A pair of pins 68 and 70, extending from the pressure plate 52, are received in a pair of conforming openings 72 and 74 in the spring arm 60 to stabilize the pressure plate 52 while allowing it to move axially.

In order that the pressure applied on the insert 58 by the spring arm 60 may be released throughout the interval during which the film is advanced, the spring arm 60 is provided with an extension 76 having an arcuate cam follower 78 thereon located in registration with the locus of travel of the tip of the claw 40 on the claw member 22. In operation, as the claw 40 penetrates one of the perforations 42 in the film strip 19 to begin a film advance stroke, the tip of the claw 40 engages the arcuate surface of the cam follower 78, impelling the spring arm 60 in a direction away from the film strip and against the torsional force exerted by spring 64; thus the pressure exerted by the spring arm 60 is totally relieved between exposure intervals as the film strip 19 is advanced.

This invention is not limited to the particular details of construction of the embodiments depicted, and it is contemplated that various and other modifications and applications will occur to those skilled in the art. Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. In a cinematographic camera, the combination comprising:

an aperture plate defining an exposure aperture and a support plane for engagement with a film strip;
a filter comprising a transparent substrate supporting a light-affecting element;
mounting means for mounting said filter in said exposure aperture with a substantially planar engageable surface lying substantially in said support plane;
a pressure plate registered with said aperture;
film advance means including driven claw means for periodically penetrating and engaging a film perforation and advancing the film to a succeeding frame with a unidirectional pull-down motion; and an intermittent pressure mechanism comprising:
    an intermittent pressure member mounted for oscillatory motion toward and away from engagement with said pressure plate,
    spring means mounted to bias said intermittent pressure member against said pressure plate,
    a cam-following element attached to said intermittent pressure member and registered with said claw means so as to be engaged and driven by said claw means during said pull-down motion, said intermittent pressure member being driven away from said pressure plate by said claw means to release during each film advance interval the pressure exerted on said pressure plate by said intermittent pressure member.

2. The apparatus defined by claim 1 including an insert carried by said pressure plate and having a smooth surface having substantially the dimensions of a frame exposure area extending from the plane of said pressure plate toward said aperture plate to act as the pressure transmitting surface during exposure.

3. The apparatus defined by claim 1 wherein said light-affecting element on said filter comprises an amplitude diffraction grating.

4. The apparatus defined by claim 1 including pressure-inducing means acting upon said pressure plate for causing a substantially constant pressure to be exerted by said pressure plate upon a film element sandwiched between said pressure plate and said filter.

5. The apparatus defined by claim 4 including a stainless steel insert carried by said pressure plate and having a smooth surface having substantially the dimensions of a frame exposure area extending from the plane of said pressure plate toward said aperture plate to act as the pressure transmitting surface during exposure.

6. The apparatus defined by claim 5 wherein said light-affecting element on said filter comprises an amplitude diffraction grating.

References Cited

UNITED STATES PATENTS 1,320,760   11/1919   Ives _____ 352—45
1,631,570    6/1927   Amet.

NORTON ANSHER, Primary Examiner

MONROE H. HAYES, Assistant Examiner

U.S. Cl. X.R.

352—42, 45